United States Patent
Bethke, II et al.

(10) Patent No.: US 11,233,781 B1
(45) Date of Patent: Jan. 25, 2022

(54) PRESENTING A PERSONALIZED VALUE ADDED OFFER DURING AN ADVANCED VERIFICATION PROCESS

(71) Applicant: American Express Travel Related Services Company, Inc., New York, NY (US)

(72) Inventors: Thomas L. Bethke, II, Scottsdale, AZ (US); Umesh Singh Chauhan, Phoenix, AZ (US); Nageshwara R. Chirravuri, Phoenix, AZ (US); Danielle R. Cloud, Scottsdale, AZ (US); Mark R. Reese, Phoenix, AZ (US); James D. Vaughn, Phoenix, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

(21) Appl. No.: 17/146,231

(22) Filed: Jan. 11, 2021

Related U.S. Application Data

(63) Continuation of application No. 15/496,739, filed on Apr. 25, 2017, now Pat. No. 10,893,034, which is a continuation-in-part of application No. 15/097,498, filed on Apr. 13, 2016, now Pat. No. 11,107,052.

(51) Int. Cl.
| | |
|---|---|
| *G06Q 30/00* | (2012.01) |
| *H04L 29/06* | (2006.01) |
| *G06Q 30/02* | (2012.01) |
| *G06Q 20/12* | (2012.01) |
| *G06Q 20/38* | (2012.01) |

(52) U.S. Cl.
CPC ............. *H04L 63/08* (2013.01); *G06Q 20/12* (2013.01); *G06Q 20/387* (2013.01); *G06Q 30/0222* (2013.01); *G06Q 30/0253* (2013.01)

(58) Field of Classification Search
CPC ....... H04L 63/08; G06Q 20/12; G06Q 20/387
See application file for complete search history.

(56) References Cited

U.S. PATENT DOCUMENTS

| | | |
|---|---|---|
| 9,460,436 B2 | 10/2016 | Ovick et al. |
| 2004/0254848 A1 | 12/2004 | Golan et al. |
| 2005/0246278 A1 | 11/2005 | Gerber et al. |

(Continued)

OTHER PUBLICATIONS

Final Office Action dated Mar. 15, 2019 in U.S. Appl. No. 15/097,498.

(Continued)

*Primary Examiner* — Alvin L Brown
(74) *Attorney, Agent, or Firm* — Sterne, Kessler, Goldstein & Fox P.L.L.C.

(57) ABSTRACT

Systems and methods for presenting a personalized value added offer during an advanced verification process are provided. An access control server may receive an enrollment verification request comprising data relating to an account holder. The server may determine an enrollment status of the account holder and determine a value added offer based on the account holder. The server may display an advanced verification interface for user input. The advanced verification interface may include the value added offer and/or a security credential prompt. The server may personalize the advanced verification interface and/or the value added offer based on monitoring the system and compiling historical transaction data.

20 Claims, 5 Drawing Sheets

(56) References Cited

U.S. PATENT DOCUMENTS

| | | |
|---|---|---|
| 2008/0040261 A1 | 2/2008 | Nix et al. |
| 2010/0280896 A1 | 11/2010 | Postrel |
| 2011/0213665 A1 | 9/2011 | Joa et al. |
| 2014/0040135 A1 | 2/2014 | Ovick et al. |
| 2016/0232556 A1 | 8/2016 | Postrel |
| 2018/0963153 | 4/2018 | Patel et al. |

OTHER PUBLICATIONS

Advisory Action dated May 29, 2019 in U.S. Appl. No. 15/097,498.
U.S. Appl. No. 15/097,498 dated Apr. 13, 2016 and titled "Systems and Methods for Presenting a Value Added Offer During Credential Authentication".
USPTO Non-Final Office Action dated Apr. 20, 2018 in U.S. Appl. No. 15/097,498.
Final Office Action dated Sep. 4, 2019 in U.S. Appl. No. 15/496,739.
Non-Final Office Action dated May 13, 2019 in U.S. Appl. No. 15/496,739.

PRESENTING A PERSONALIZED VALUE ADDED OFFER DURING AN ADVANCED VERIFICATION PROCESS

CROSS REFERENCE TO RELATED APPLICATION

This application is a continuation of U.S. patent application Ser. No. 15/496,739 filed Apr. 24, 2017 and entitled "PRESENTING A PERSONALIZED VALUE ADDED OFFER DURING AN ADVANCED VERIFICATION PROCESS," which application is a Continuation-In-Part of, claims priority to and the benefit of, U.S. patent application Ser. No. 15/097,498 filed Apr. 13, 2016 and entitled "SYSTEMS AND METHODS FOR PRESENTING A VALUE ADDED OFFER DURING CREDENTIAL AUTHENTICATION," which all are hereby incorporated by reference in its entirety for all purposes.

FIELD

The disclosure generally relates to financial transactions, and more specifically, to presenting personalized value added offers during advanced verification processes to financial transaction account owners.

BACKGROUND

Digital payment transactions may include a consumer providing transaction account information to complete an online transaction (e.g., for purchase and/or to store credential on file for future transactions). The transaction often involves entry of the account information including an account identifier into an online form. The account identifier may be imprinted on or encoded in a payment instrument that may take the form of a credit card, debit card, gift card, stored value card, digital token, and the like. Despite improvements, online payments are generally considered to be of higher risk than traditional transactions where a physical card is swiped or a device is read at a merchant's point of sale terminal.

To address the added risk involved in online transactions, efforts have been made to improve identity verification processes. One such improvement includes a two-step verification process. Other solutions utilize various configurations of encrypted digital certificates, tokens, biometrics, and/or time-based hard tokens to provide an added level of certainty to the verification process. However, added security processes may require the consumer to follow additional steps, which some may consider to be inconvenient or overly time-consuming. Having too many steps or requiring too much additional time presents added opportunities for a customer to abandon the purchase transaction.

As such, a system may be desired that allows additional security processes to be implemented for online (e.g., card not present) transactions, while also providing an additional incentive to the customer to follow-through with the purchase process. A method may be desired to provide an added value to customers to complete, rather than abandon a purchase due to identity verification steps that some customers might see as burdensome.

SUMMARY

Systems, methods, and articles of manufacture (collectively, the "system") for presenting a personalized value added offer during an advanced verification process are disclosed. The system may receive an enrollment verification request. The enrollment verification request may comprise data relating to an account holder. The system may determine an enrollment status of the account holder. The system may determine a value added offer based on the account holder. The system may display an advanced verification interface. The advanced verification interface may comprise at least one of the value added offer or a security credential prompt. The system may receive a security credential input and a value added offer response.

In various embodiments, the system may also monitor at least one of the received security credential input, the received value added offer response, and/or the displayed advanced verification interface. The system may compile a historical transaction data based on the monitoring. The system may personalize the advanced verification interface based on the historical transaction data. The advanced verification interface may be personalized by removing at least one of a security credential field or an update account holder data field.

In various embodiments, the system may personalize the value added offer to generate a personalized value added offer. The personalized value added offer may be based on the historical transaction data. The historical transaction data may comprise at least one of a value added offer response, a usage rate, an abandonment rate, or a recent purchase transaction.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

Figure 1A:
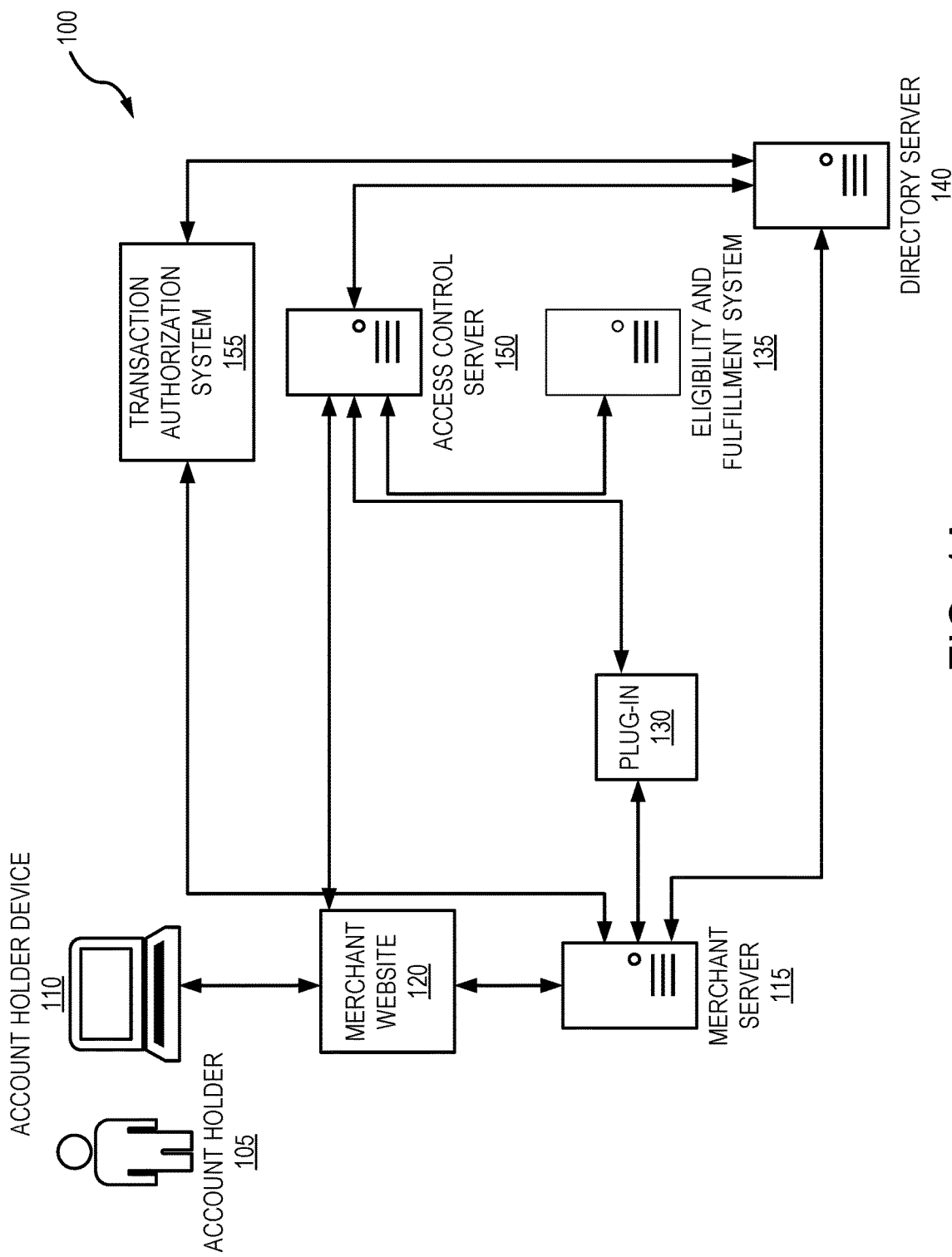
FIG. 1A is a block diagram illustrating various system components for a system of determining account holder eligibility for a value added offer, in accordance with various embodiments.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

The present disclosure provides a system, method, and computer program product for selecting and/or presenting a value added offer to an account holder from a payment account issuer in a merchant website (and/or merchant mobile application) around the time of purchase authorization. As used herein, a "value added offer" may include an offer, an item, a service, a relevant communication, and/or the like. Phrases and terms similar to an "item" may include any good, service, information, experience, entertainment, data, offer, discount, rebate, points (e.g., reward points), virtual currency, content, access, rental, lease, contribution, account, credit, debit, benefit, right, reward, coupons, credits, monetary equivalent, anything of value, something of minimal or no value, monetary value, non-monetary value, and/or the like. Moreover, the "transactions" or "purchases" discussed herein may be associated with an item. Furthermore, a "reward" may be an item. For example, the issuer could provide messaging to the account holder that is a message and/or reminder. For example, the system may provide a benefit reminder similar to "your card has purchase protection on electronics" when a transaction is happening at an electronics merchant or an automatic bonus such as "you get double cashback at retail merchants for the next 90 days".

In general, the value added offer may be selected and presented within the context of an advanced verification system. A process under the advanced verification system may be invoked in response to receiving a purchase selection and a first authorization amount from an account holder interacting with a merchant website. A merchant server receives account properties for an account from the merchant website, where the account properties are provided by an account holder. An access point (e.g., a uniform resource locator (URL), API, etc.) is received at the merchant server in response to confirming enrollment of the account in an advanced verification system.

The merchant server may present an interface based on the access point. The interface accepts a security credential from the account holder and displays a value added offer. In one example, based on the account holder's acceptance of the presented value added offer, a second authorization amount is calculated based on the first authorization amount minus a reward amount associated with the value added offer.

More specifically, with reference to FIG. 1A, a system 100 for determining account holder eligibility for a value added offer during a security verification process is disclosed. The system 100 may be computer based, and may comprise a processor, a tangible non-transitory computer-readable memory, and/or a network interface, along with other suitable system software and hardware components. Instructions stored on the tangible non-transitory memory may allow the system 100 to perform various functions, as described herein. The system 100 may also contemplate uses in association with web services, utility computing, pervasive and individualized computing, security and identity solutions, autonomic computing, cloud computing, commodity computing, mobility and wireless solutions, open source, biometrics, grid computing and/or mesh computing. In various embodiments, the system 100 may include an account holder device 110, a merchant server 115, a merchant website 120, a merchant plug-in 130, an eligibility and fulfillment system 135, a directory server 140, an access control server 150, and a transaction authorization system 155. An account holder 105 may interact with the system 100 by way of the account holder device 110.

In various embodiments, the account holder device 110 may comprise hardware and/or software capable of allowing the account holder 105 access to system 100. For example, the account holder device 110 may comprise any suitable device allowing the account holder 105 to communicate with a network, such as a personal computer, personal digital assistant, cellular phone, kiosk, and/or the like. The account holder device 110 may be in electronic and/or operative communication with the merchant server 115. For example, the account holder device 110 may be connected to the merchant server 115 by way of a network, such as, for example, a wide area network, such as the Internet, and/or any other suitable network described herein or known in the art. The merchant website 120 may be hosted at the merchant server 115, providing an interface to various applications, functions, data, and/or the like that reside with and/or are accessible by the merchant server 115. Those of ordinary skill in the art will appreciate that websites are often hosted by third-party providers who are contracted to maintain the hardware and software systems on behalf of a contracting entity. As such, the location and ownership of the merchant server 115 or any system 100 component may not be material to the functionality disclosed herein.

The account holder device 110 may be equipped with an application that is configured to present information from the merchant server 115, via the merchant website 120, to the account holder 105. In various embodiments, the application may be a web browser that functions to allow the account holder 105 to interact with the merchant website 120 by way of one or more webpages. Further, an application such as a web browser may provide an interface to accept inputs from the account holder 105 including, for example, mouse clicks, keyboard text, voice, etc. In that respect, the account holder 105 may interact with the merchant website 120, via the account holder device 110, to view and/or purchase items, services, and/or the like.

The merchant server 115 may include applications that are configured to manage one or more of the interactions with external systems, as described further herein. The merchant server 115 may comprise multiple components or modules that function together to provide the disclosed features. The merchant server 115 may manage the merchant website 120 to present information and receive inputs from the account holder 105 by way of the account holder device 110. The merchant server 115 may also be configured to process information received from the account holder device 110 in order to format the received inputs into data packets, messages, and/or the like to be transmitted over a network to the eligibility and fulfillment system 135, the access control server 150, and/or the transaction authorization system 155, as discussed further herein. For example, in response to the account holder 105 initiating a purchase transaction (e.g., attempting to purchase an item, service, and/or the like via the merchant website 120), the merchant server 115 may prompt the account holder 105, via an interactive account interface displayed on the merchant website 120, to select a payment method and/or enter payment account information (e.g., account number, name, address, etc.). For example, the payment method may comprise a credit card, a debit card, a bank account number, PayPal®, and/or the like. Furthermore, upon selecting "credit card" or "debit card", the merchant server 115 may prompt the account holder 105 to select the card issuer (e.g., American Express®, Capital One®, Chase®, Wells Fargo®, etc.).

In various embodiments, the merchant server 115 may include the merchant plug-in 130 that is configured to provide an advanced verification system for purchase transactions. The merchant plug-in 130 may include a network connection to the access control server 150. In various embodiments, the merchant plug-in 130 component may be a standalone set of computer instructions or may reside as one or more specialized modules, functions, and/or the like that are integrated into the merchant server 115. In various embodiments, all or a subset of the described features of the merchant plug-in 130 may be provided by a third-party provider and/or commercial product for managing the advanced authentication processes. The features described in reference to the merchant plug-in 130 may include other features relative to other components. Accordingly, the system 100 may utilize a product API to extend the features and modify the transported request and response messages in order to provide the value-added presentation and acceptance features. For example, a commercially available product may provide an API for customizing the appearance of various interfaces that are used during the authentication process. Additionally, the API may allow request and response message parameters to be added or customized in order to account for the varying needs of the product owners.

In response to receiving the payment method and/or payment account information from the account holder device 110, the merchant server 115 may invoke the merchant plug-in 130. The merchant plug-in 130 may be configured to communicate with the access control server 150 to determine whether the account holder 105 is enrolled in the advanced verification system. For example, the merchant plug-in 130 may be configured to generate an enrollment verification request. The enrollment verification request may comprise data corresponding to the account holder 105, such as, for example, the account number, account holder identifying information (e.g., name, address, etc.), and/or the like. The merchant plug-in 130 may transmit the enrollment verification request to the access control server 150.

The access control server 150 may comprise various hardware, software, and/or database components. In various embodiments, the access control server 150 may include a network connection with the directory server 140, the eligibility and fulfillment system 135, the merchant plug-in 130, and/or the merchant website 120 (via the merchant server 115). The access control server 150 may be configured to determine whether the account holder 105 is enrolled in the advanced verification system. For example, the access control server 150 may receive the enrollment verification request from the merchant plug-in 130, parse the request to determine the account holder data contained therein, and communicate with the directory server 140 to locate corresponding account holder information. In various embodiments, the directory server 140 may take the form of a hardware component, a software component, or a combination of both hardware and software. Further, the directory server 140 may be managed by a third-party on behalf of an account issuer. The directory server 140 may maintain a connection with the access control server 150 in order to provide account holder information based on inquiries received from the access control server 150. In that respect, the directory server 140 may comprise a database containing account holder information. For example, the directory server 140 may store and maintain data such as, for example, an account number, user account access data (e.g., username, password, etc.), account holder identifying information (e.g., address, city, state, zip code, etc.), a card security code (CSC) or a card verification value (CVV), account balance, account payment history, transaction history, account type, credit limit, advanced verification system enrollment status (e.g., a "Y" or "N", and/or the like), a membership rewards balance, and/or other such similar data. The access control server 150 may query the directory server 140 to at least partially match the data parsed from the enrollment verification request. In response to locating a match, the access control server 150 may determine the advanced verification system enrollment status.

In response to determining that the account holder 105 is not enrolled in the advanced verification system and/or in response to being unable to at least partially locate a match in the directory server 140, the access control server 150 may respond to merchant plug-in 130 with a status indicator of "N", or the like. In response to determining that the account holder 105 is enrolled in the advanced verification system, the access control server 150 may respond to merchant plug-in 130 with a status indicator of "Y", or the like. In various embodiments, in response to determining that the account holder 105 is enrolled in the advanced verification system, the access control server 150 may also be configured to determine an eligible value added offer. The access control server 150 may communicate with the eligibility and fulfillment system 135 to determine the eligible value added offer.

In various embodiments, the eligibility and fulfillment system 135 may comprise various hardware, software, and/or database components. For example, the eligibility and fulfillment system 135 may comprise an offer database. The offer database may store and maintain one or more value added offers and related data. Each value added offer may comprise any suitable data (e.g., markers, metadata, notes, etc.), such as, for example, a value added offer ID, a merchant ID (e.g., the corresponding merchant ID of the merchant offering the value added offer), a value added offer description (e.g., "rewards points"), and/or the like. In various embodiments, the eligibility and fulfillment system 135 may determine the eligible value added offer for the account holder 105 based at least partially on an account property or a merchant property. For example, the eligibility and fulfillment system 135 may query the directory server 140, via the access control server 150, to retrieve account properties for the corresponding account holder 105, such as, for example, account balance, account payment history, transaction history, account type, credit limit, membership rewards balance, and/or the like. As a further example, the eligibility and fulfillment system 135 may query the merchant server 115, via the access control server 150 and the merchant plug-in 130, to retrieve merchant properties for the corresponding merchant, such as, for example, shopping cart timeout settings, fraud and/or risk considerations, credit lending capabilities, reward points acceptance, and/or the like. Based at least partially on the account property or the merchant property, the eligibility and fulfillment system 135 may determine and retrieve from the offer database one or more value added offers. The eligibility and fulfillment system 135 may transmit the eligible value added offers to the access control server 150.

In various embodiments, the access control server 150 may transmit the eligible value added offer to the merchant plug-in 130 simultaneously with the status indicator. In various embodiments, the access control server 150 may also transmit the eligible value added offer to the merchant plug-in 130 at a distinct time from the status indicator. The access control server 150 may also transmit an advanced verification access point to the merchant plug-in 130. The advanced verification access point may comprise data pointing to a network location (e.g., a web server) for authenticating the account holder 105 and presenting the value added offer. In that respect, the advanced verification access point may be hosted on the access control server 150, and/or on any other suitable location in the system 100. The advanced verification access point may comprise a webpage, interface, and/or the like, prompting the account holder 105 to enter security credentials and displaying the value added offer. The merchant plug-in 130 may transmit the status indicator, the eligible value added offer, and/or the advanced verification access point to the merchant server 115.

Figure 3:
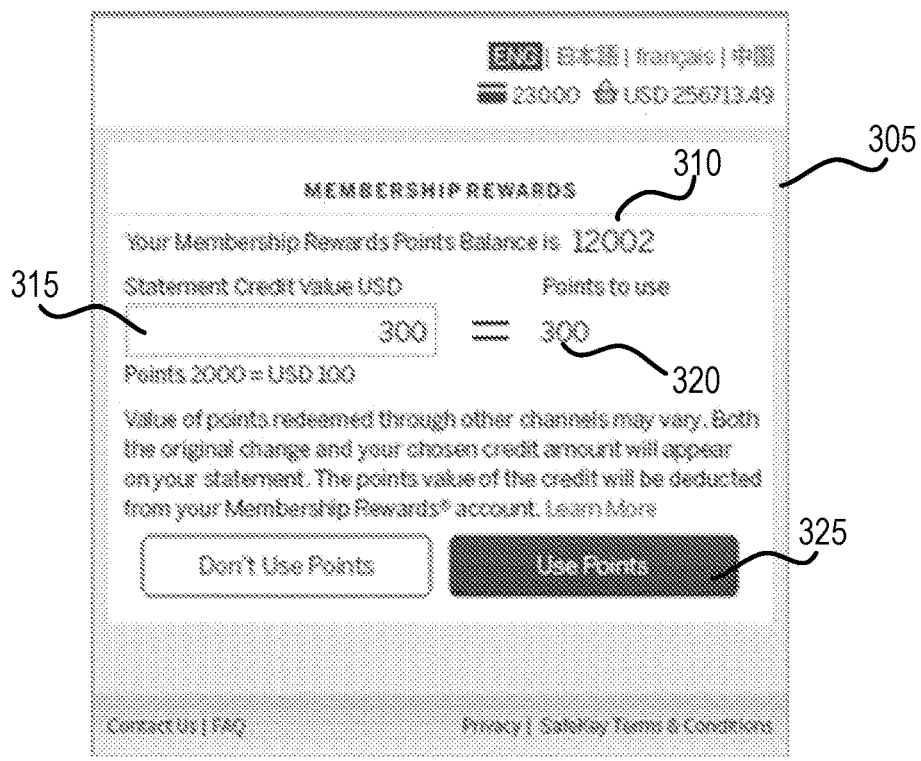
FIG. 3 depicts an exemplary interface for presenting and receiving account holder selection of a value added offer, in accordance with various embodiments.
Figure 4:
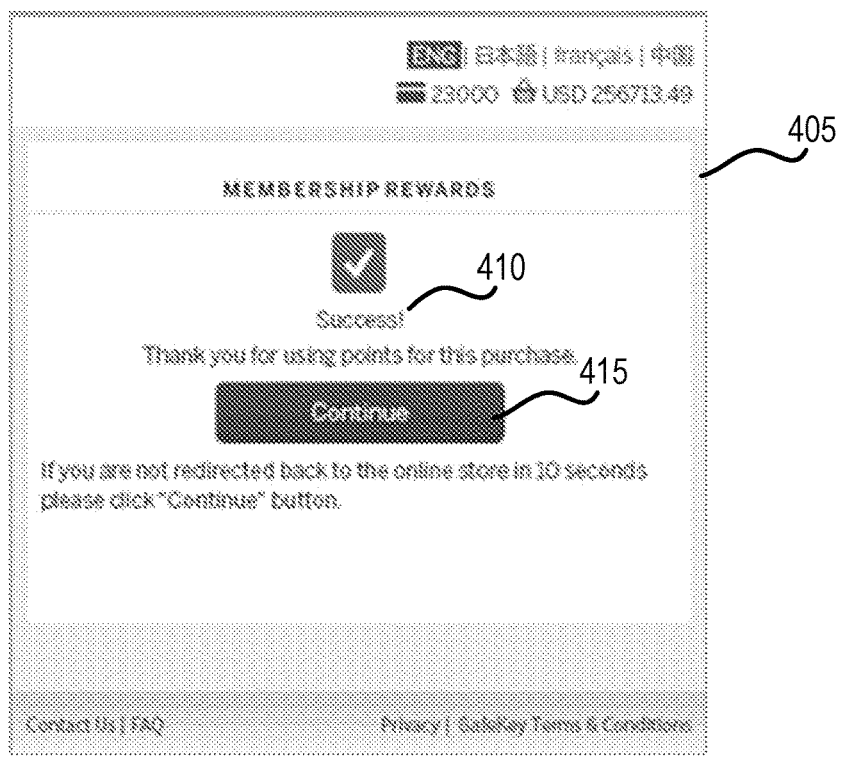
FIG. 4 depicts an exemplary interface for confirming an account holder's acceptance of a value added offer during a purchase transaction, in accordance with various embodiment.

In various embodiments, the merchant server 115 may direct the merchant website 120 to the advanced verification access point (e.g., via the URL, IP address, etc.). In that respect, the merchant website 120 may open a browser window to display on the account holder device 110 an advanced verification interface prompting the account holder 105 to input security credentials and/or display the eligible value added offer. The account holder 105 may interact with the advanced verification interface to input security credentials, such as, for example, a username and password, an access code, and/or through any other suitable authentication method. The account holder 105 may also interact with the advanced verification interface to accept or reject the eligible value added offer (e.g., as depicted in FIGS. 3 and 4, discussed further herein).

In response to the account holder 105 submitting the security credential input, the access control server 150 may authenticate the account holder 105. For example, the access control server 150 may authenticate the account holder 105 by comparing the submitted username and password against a stored username and password in the directory server 140, by comparing the submitted access code against a stored access code, and/or through any other suitable authentication method. In response to authenticating the account holder 105 credentials, the access control server 150 may transmit an authentication result to the merchant server 115, via the merchant plug-in 130. In various embodiments, the authentication result may be digitally signed by the access control server 150 to ensure that the authentication result is not compromised before reaching the merchant server 115. The merchant plug-in 130 may validate the digital signature and transmit the authentication result to the merchant server 115.

In response to the account holder 105 accepting the value added offer, the access control server 150 may communicate with the eligibility and fulfillment system 135 to fulfill the value added offer. For example, in various embodiments, an authorization amount associated with the purchase transaction may be modified in response to the account holder 105 accepting the value added offer (e.g., wherein the value added offer comprises using reward points, a rebate, etc.). Specifically, for example, the authorization amount may be reduced based by subtracting a value added offer amount, by applying a percent rebate to the authorization amount, and/or the like to generate a second authorization amount. The second authorization amount may be transmitted by the eligibility and fulfillment system 135 to the merchant server 115, via the merchant plug-in 130. In various embodiments, an acceptance of the value added offer may not directly impact the purchase transaction. For example, the value added offer may include an option to apply a reward balance or a credit to offset an outstanding balance on the corresponding account.

Figure 1B:
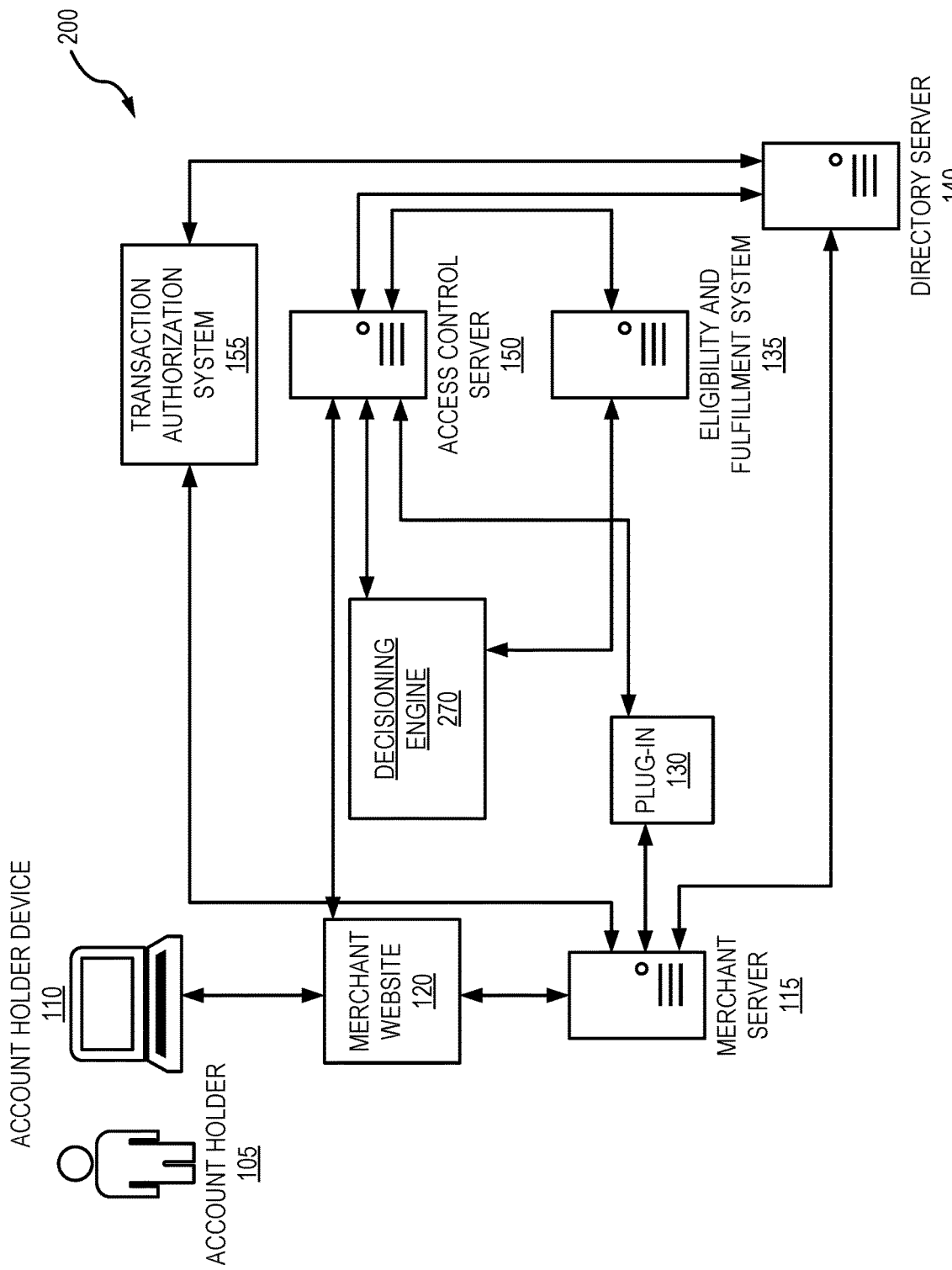
FIG. 1B is a block diagram illustrating various system components including a decisioning system for a system of determining account holder eligibility for a value added offer, in accordance with various embodiments.

In various embodiments, and with reference to FIG. 1B, the system 200 may also comprise a decisioning engine 270. The decisioning engine 270 may be in operative and/or electronic communication with the eligibility and fulfillment system 135 and/or the access control server 150. The decisioning engine 270 may be configured to monitor purchase transactions and compile historical transaction data, via the access control server 150. The historical transaction data may comprise data regarding interactions and/or behaviors of the account holder 105 during purchase transactions, during any interaction with the system 200, during selection and/or acceptance of value added offers, and/or the like. In various embodiments, the historical transaction data may also comprise data about similar account holders (e.g., similar account holders having similar purchase transaction histories, etc.). For example, the decisioning engine 270 may be configured to monitor the value added offer responses (e.g., acceptance or rejection) during the advanced verification system. In that respect, the decisioning engine 270 may track an acceptance percentage for each value added offer, a usage rate for each value added offer, and/or the like. The decisioning engine 270 may also track the abandonment of purchase transactions using the advanced verification system (e.g., an abandonment rate). For example, an abandonment of a purchase transaction may take place when the account holder 105 does not complete the purchase transaction after being prompted for security credentials at the advanced verification system interface. As a further example, the decisioning engine 270 may track the abandonment of purchase transactions caused by technical errors (e.g., the website timing out, a merchant server crashing, etc.). The decisioning engine 270 may also track recent purchase transactions where the account holder 105 successfully completed a purchase transaction using the advanced verification system interface (e.g., the date, time, location, etc. of the completed purchase transaction), and/or the value added offers used by each individual account holder 105.

In various embodiments, the decisioning engine 270 may also track an account holder behavior, a usage behavior, and/or an account holder preference. For example, an account holder behavior may comprise data regarding the account holder's 105 behavior on previous purchase transactions such as, for example, a timing of the account holder 105 through the purchase process (e.g., how quickly the account holder 105 clicks through informational screens during the purchase transaction), whether value added offers increase spending of the account holder 105 relative to the account holder 105 not being presented a value added offer, and/or the like. For example, a usage behavior may comprise data indicating how often the account holder 105 completes purchase transactions through system 100, a previous time the account holder 105 made a purchase transaction (e.g., a date, a time, etc.), the types of purchases the account user makes, the times of the year that the account holder typically makes larger purchases (e.g., at Christmas, etc.), and/or the like. For example, a customer preference may comprise data indicating the types of purchase transactions the account holder 105 may typically redeem reward points on (e.g., at electronics merchants, at travel merchants, etc.), the types of purchase transactions the account holder 105 may typically use lending options at, and/or the like.

In various embodiments, the decisioning engine 270 may be configured to personalize the advanced verification system for the corresponding account holder 105. In that respect, the decisioning engine 270 may personalize the advanced verification system by changing the display (e.g., the advanced verification interface) of the advanced verification access point viewed by the account holder 105 via the merchant website 120. The decisioning engine 270 may personalize the advanced verification system based on the historical transaction data. For example, the decisioning engine 270 may personalize the advanced verification interface by not requiring a security credential entry, by not displaying additional fields to update account holder data, and/or the like. The historical transaction data may comprise data indicating that the account holder 105 has a high purchase transaction abandonment rate, that the account holder 105 recently completed a purchase transaction using the advanced verification system within the hour, that the account holder 105 has recently abandoned purchase transactions due to technical errors, and/or the like. As a further example, the advanced verification interface may be personalized by providing additional informational overlays (e.g., in response to the historical transaction data indicating that it is the account holder's 105 first use of the system, the advanced verification interface may display help dialogue), by displaying different methods of authentication, by providing greater detail in error messages, by increasing authentication steps and/or difficulty (e.g., in response to an account holder's 105 behavior being out of pattern), and/or the like.

In various embodiments, the decisioning engine 270 may also be configured to personalize the value added offer for the corresponding account holder 105. The decisioning engine 270 may personalize the value added offer based on the historical transaction data. For example, in response to the account holder 105 being eligible for more than one value added offer, the decisioning engine 270 may generate a personalized value added offer to comprise the best value added offer for the account holder 105. For example, based on the historical transaction data the decisioning engine 270 may determine that that the given account holder 105 is unlikely to accept a value added offer for a future credit, but is 90% likely to accept a value added offer to use reward points. In that regard, the decisioning engine 270 may generate the personalized value added offer to comprise the value added offer of using reward points. As a further example, in response to the historical transaction data indicating that the account holder 105 typically uses value added offers for retail purchases, travel purchases, or high dollar amount purchases, decisioning engine 270 may only display the value added offer for those purchase transactions, or may display the value added offer for purchase transactions not involving those typical purchases (e.g., to provide an incentive for the account holder 105). In response to the historical transaction data indicating that the account holder 105 never (or rarely) uses value added offers, the decisioning engine 270 may not display value added offers for that account holder 105. As a further example, the decisioning engine 270 may personalize the value added offer in response to the type of account holder device 110 the account holder 105 is using (e.g., a different value added offer for account holder 105 using a computer, a tablet, a smartphone (e.g., APPLE® iPHONE®, etc.), and/or the like).

With reference again to FIG. 1A, in response to receiving an affirmative authentication result, the merchant server 115 may be configured to process and/or authorize the purchase transaction. In various embodiments, the merchant server 115 may establish communications with the transaction authorization system 155 in order to transmit purchase authorization requests (e.g., an authorization request, an authorization amount, etc.). In various embodiments, the transaction authorization system 155 resides within a payment network to provide, for example, authorization of a transaction based on a credit account (e.g., a transaction account) of the account holder 105. The payment network may be a closed network that is assumed to be secure from eavesdroppers. Exemplary transaction networks may include the American Express®, VisaNet® and the Veriphone® networks. Those of ordinary skill in the art will appreciate that the transaction authorization system 155 may comprise any number of connected hardware, software, and/or database components that together provide the authorization features described herein. For example, the transaction authorization system 155 may comprise an account holder database, and/or the like, configured to store and maintain data regarding transaction accounts. For example, the account holder database may comprise data such as a transaction account number, account holder identifying information (e.g., owner address, city, state, zip code, etc.), a card security code (CSC) or a card verification value (CVV), transaction account balance, and/or other such similar data. In various embodiments, the transaction authorization system 155 may also communicate with the directory server 140 to retrieve account holder information.

The merchant server 115 may transmit the purchase transaction information to the transaction authorization system 155. The transaction authorization system 155 may authorize the purchase transaction by comparing the purchase transaction information to the account holder information (e.g., compare the received transaction account number to a stored transaction account number, the purchase transaction amount to the transaction account balance, the received CSV/CVV codes to the stored CSV/CVV codes, the received account holder identifying information to the stored account holder identifying information, etc.). In response to authorizing the purchase transaction, the transaction authorization system 155 may transmit an authorization code to the merchant server 115. The merchant server 115 may store the authorization code as proof of the purchase transaction and may issue a receipt to the account holder 105. In various embodiments, the authorized purchase transaction may be stored as a pending transaction to later be settled by the merchant.

As used herein, phrases similar to "tokenize" or "tokenization" may refer to generation of an alias or alternative identifier for sensitive data. For example, an account token may comprise an alternative account identification code generated to obfuscate an actual transaction account code for inclusion in payment transactions, whether those transactions are facilitated by a point of sale (POS) or online (e.g., a payment interface presented by the merchant website). In that regard, tokenization of sensitive data may tend to create a barrier for third parties trying to capture the underlying sensitive data. Tokenization further restricts or prevents use of a payment transaction account beyond one or more defined parameter(s) such as, for example, an identity of a specific merchant and a transaction amount. Additional parameters may include, for example, a maximum overall spend amount, maximum number of transactions, maximum transaction amount, and expiration date.

Phrases and terms similar to "merchant" may be used interchangeably with each other and shall mean any person, entity, distributor system, software and/or hardware that function as a provider, broker and/or any other entity in the distribution chain of goods or services. For example, a merchant may be a grocery store, a retail store, a travel agency, a service provider, an on-line merchant, and/or the like. By way of a POS, for example, a merchant may be the party responsible for collecting token information from the user. A merchant's POS or similar device may transmit this information along with transaction details over a payment network as an authorization request.

Referring now to FIGS. 2-5 the process flows and screenshots depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements depicted in FIGS. 2-5, but also to the various system components as described above with reference to FIGS. 1A and 1B.

Figure 2:
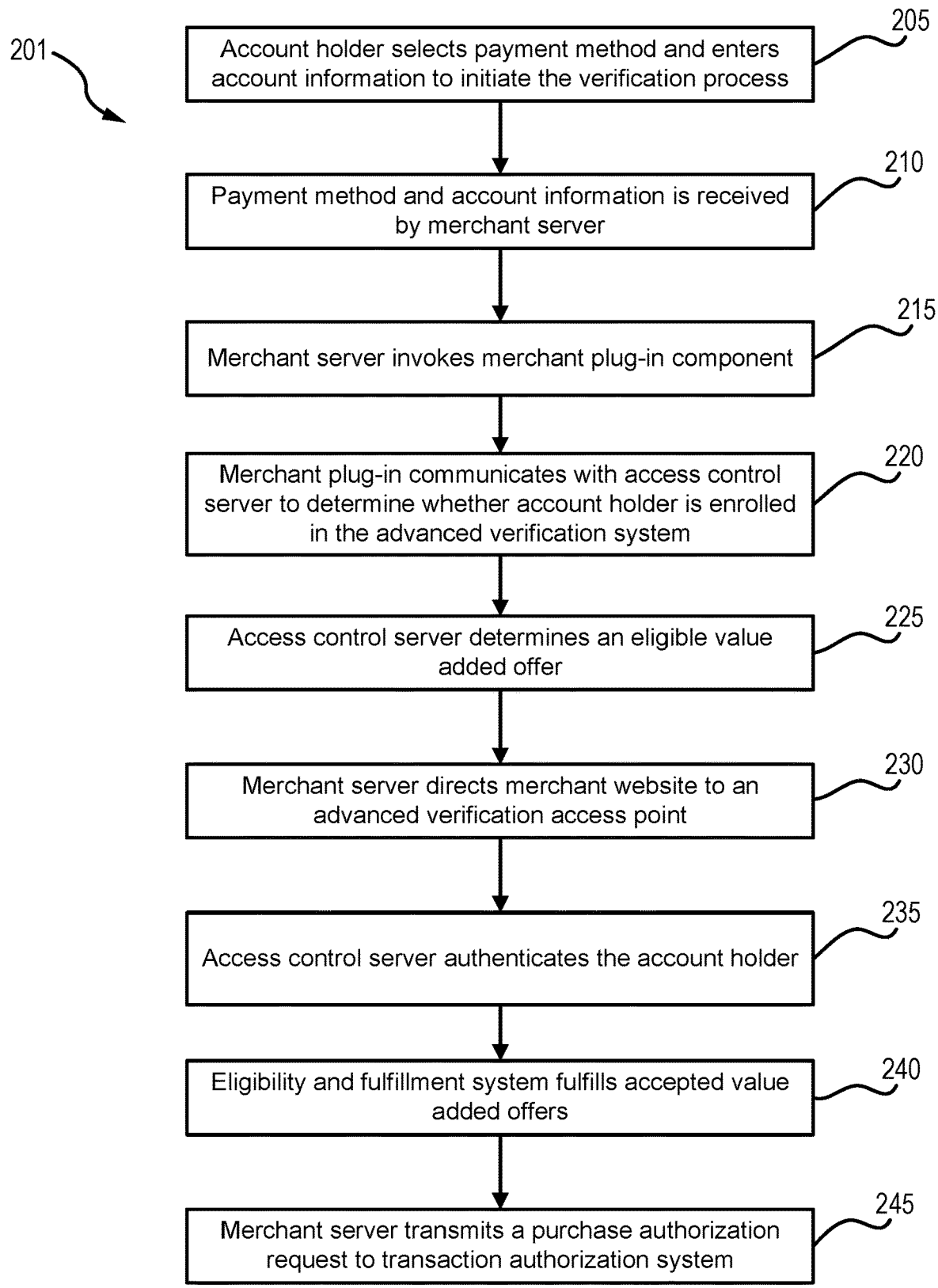
FIG. 2 illustrates a process flow for a method of determining account holder eligibility for a value added offer during an advanced verification process, in accordance with various embodiments.

In various embodiments, and with reference to FIG. 2, a method 201 for determining account holder eligibility for a value added offer during a security verification process is disclosed. The account holder 105 may shop at a merchant website 120 hosted at a merchant server 115, where one or more products and/or services (collectively, "items") are offered for purchase within a presentation interface. By way of the account holder device 110, the account holder 105 may select one or more items from the presentation interface and indicate a desire to purchase the selected items, invoking a verification and payment process. In response, the account holder 105 may select a payment method and input account information to initiate the verification process (step 205). More specifically, the merchant website 120 may be directed to present an interface to allow the account holder 105 to select a desired payment method. In response to the payment method selection, an account interface may be presented by way of the merchant website 120. The account interface may allow the account holder 105 to input their payment account information, including an account identifier (e.g., account number). The payment method and the payment account information may be received by the merchant server 115 (step 210). The merchant server 115 may invoke the merchant plug-in 130 (step 215). For example, in response to receiving the payment method and/or payment account information from the account holder device 110, the merchant server 115 may invoke the merchant plug-in 130.

The merchant plug-in 130 may communicate with the access control server 150 to determine whether the account holder 105 is enrolled in the advanced verification system (step 220). For example, the merchant plug-in 130 may be configured to generate an enrollment verification request. The enrollment verification request may comprise data corresponding to the account holder 105, such as, for example, the account number, account holder identifying information (e.g., name, address, etc.), and/or the like. The merchant plug-in 130 may transmit the enrollment verification request to the access control server 150. The access control server 150 may communicate with the directory server 140 to locate corresponding account holder information and to determine the enrollment status. For example, the access control server 150 may query the directory server 140 to at least partially match data from the enrollment verification request. In response to locating a match, the access control server 150 may determine the advanced verification system enrollment status. The access control server 150 may respond with a status indicator of "Y" in response to the account holder 105 being enrolled in the advanced verification system. The access control server 150 may respond with a status indicator of "N" in response to the account holder 105 not being enrolled in the advanced verification system.

The access control server 150 may determine an eligible value added offer (step 225). For example, in response to determining that the account holder 105 is enrolled in the advanced verification system, the access control server 150 may communicate with the eligibility and fulfillment system 135 to determine one or more eligible value added offers. The eligibility and fulfillment system 135 may determine the eligible value added offer for the account holder 105 based at least partially on an account property or a merchant property. For example, the eligibility and fulfillment system 135 may query the directory server 140 to retrieve account properties for the corresponding account holder 105. The eligibility and fulfillment system 135 may query the merchant server 115, via the merchant plug-in 130, to retrieve merchant properties for the corresponding merchant. Based at least partially on the account property or the merchant property, the eligibility and fulfillment system 135 may determine and retrieve from an offer database one or more value added offers. The eligibility and fulfillment system 135 may transmit the eligible value added offers to the access control server 150. The access control server may transmit an advanced verification access point, the status indicator, and/or the eligible value added offers to the merchant server 115, via the merchant plug-in 130. The advanced verification access point may comprise data pointing to a network location (e.g., a web server) for authenticating the account holder 105 and presenting the value added offer.

The merchant server 115 may direct the merchant website 120 to the advanced verification access point (step 230). The advanced verification access point may allow the merchant website 120 to display an advanced verification interface (e.g., in a web browser window in the account holder device 110). The advanced verification interface may prompt the account holder 105 to input security credentials. The advanced verification interface may also display one or more eligible value added services.

The access control server 150 may authenticate the account holder 105 (step 235). The access control server 150 may authenticate the account holder 105 in response to the account holder 105 submitting a security credential input. For example, the access control server 150 may authenticate the account holder 105 by comparing the submitted username and password against a stored username and password in the directory server 140, by comparing the submitted access code against a stored access code, and/or through any other suitable authentication method. In response to authenticating the account holder 105 credentials, the access control server 150 may transmit an authentication result to the merchant server 115, via the merchant plug-in 130. The eligibility and fulfillment system 135 may fulfill an accepted value added offer (step 240). In response to the account holder 105 accepting the value added offer, the access control server 150 may communicate with the eligibility and fulfillment system 135 to fulfill the value added offer. For example, in various embodiments, an authorization amount associated with the purchase transaction may be modified in response to the account holder 105 accepting the value added offer (e.g., wherein the value added offer comprises using reward points, a rebate, etc.). Specifically, for example, the authorization amount may be reduced based by subtracting a value added offer amount, by applying a percent rebate to the authorization amount, and/or the like to generate a second authorization amount. The second authorization amount may be transmitted by the eligibility and fulfillment system 135 to the merchant server 115, via the merchant plug-in 130. In various embodiments, an acceptance of the value added offer may not directly impact the purchase transaction. For example, the value added offer may include an option to apply a reward balance or a credit to offset an outstanding balance on the corresponding account holder's account.

The merchant server 115 may transmit a purchase authorization request to the transaction authorization system 155 (step 245). For example, the merchant server 115 may transmit the purchase authorization request in response to receiving an affirmative authentication result from the access control server 150. The purchase authorization request may process as a typical credit account purchase. In various embodiments, the transaction authorization system 155 may authorize the purchase transaction by comparing the purchase transaction information to the account holder information (e.g., compare the received transaction account number to a stored transaction account number, the purchase transaction amount to the transaction account balance, the received CSV/CVV codes to the stored CSV/CVV codes, the received account holder identifying information to the stored account holder identifying information, etc.). In response to authorizing the purchase transaction, the transaction authorization system 155 may transmit an authorization code to the merchant server 115. The merchant server 115 may store the authorization code as proof of the purchase transaction and may issue a receipt to the account holder 105. In various embodiments, the authorized purchase transaction may be stored as a pending transaction to later be settled by the merchant.

In various embodiments, and with reference to FIG. 3, an interface 305 is illustrated for presenting and receiving account holder selection of a value added offer, in accordance with various embodiments. For example, in response to the account holder being eligible for a value added offer that reduces a statement amount by a balance of reward points, the interface 305 might include a rewards account point balance 310. A field is included that allows the account holder to enter an amount 315 of the rewards account point balance that the account holder wishes to be applied to a next statement. The entered rewards may be used to offset an amount owing on the next statement. A balance of remaining reward points 320 may reflect the remaining reward account point balance if the amount of the entered points is redeemed. Button options may allow the account holder to accept the value added offer 325 and proceed with the authorization.

In various embodiments, and with reference to FIG. 4, an interface 405 is illustrated for confirming account holder's acceptance of a value added offer during a purchase transaction, in accordance with various embodiments. In response to a value added offer being accepted by the account holder, a status 410 confirms when the transaction is successful. An option 415 is also provided to allow the account holder to continue and finalize the purchase transaction.

Figure 5:
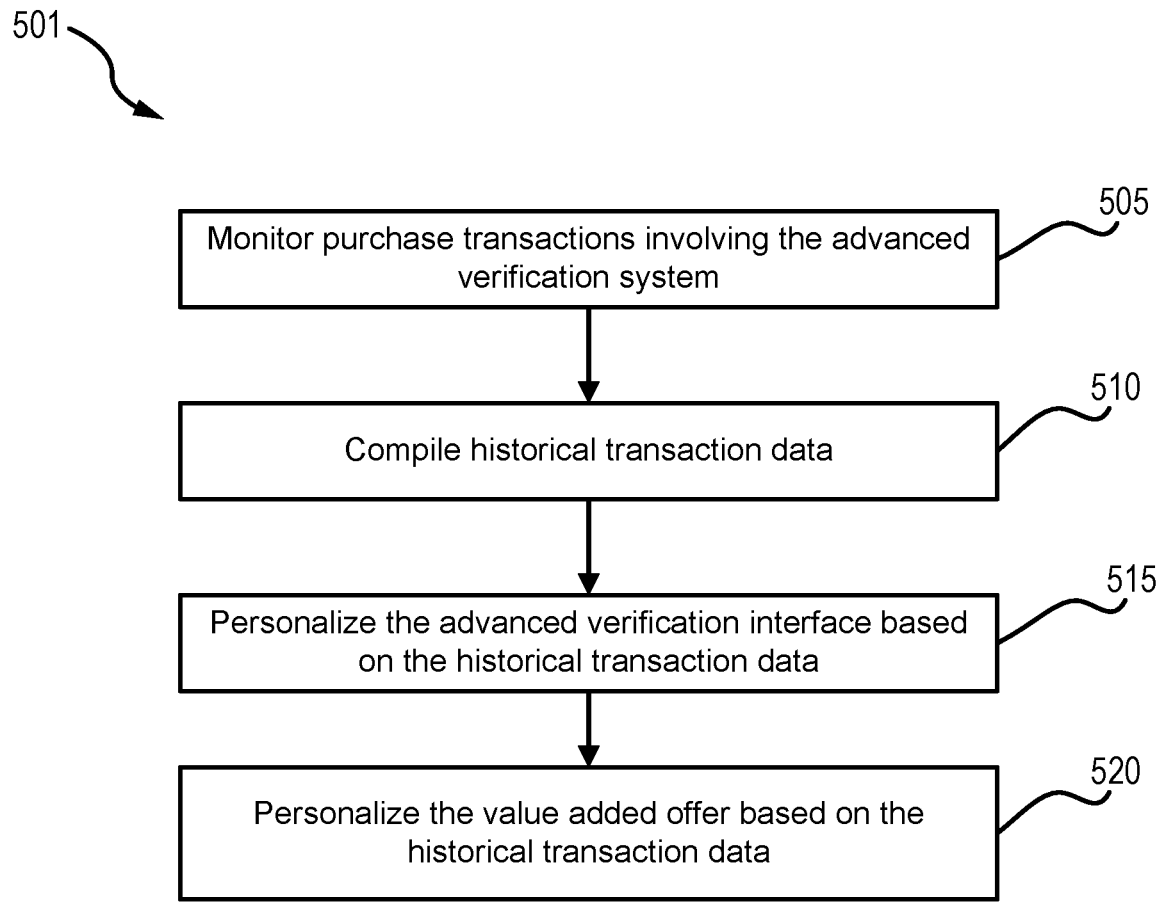
FIG. 5 illustrates a process flow for a method of personalizing a value added offer during an advanced verification process, in accordance with various embodiment.

In various embodiments, and with reference to FIG. 5, a method 501 of personalizing a value added offer during an advanced verification process is disclosed. Method 501 may comprise monitoring the purchase transactions involving the advanced verification system (step 505). The decisioning engine 270 may be configured to monitor purchase transactions. For example, the decisioning engine 270 may monitor the purchase transactions involving the advanced verification system in real time, semi-real time, and/or at any other time interval. Method 501 may comprise compiling historical transaction data (step 510). The decisioning engine 270 may compile the historical transaction data, based on the monitoring of the purchase transactions, and/or based on the monitoring of account holder 105 interactions with the system 100. For example, the decisioning engine 270 may be configured to monitor the acceptance and rejection of value added offers during the advanced verification system. In that respect, the decisioning engine 270 may track an acceptance percentage for each value added offer, a usage rate for each value added offer, and/or the like. The decisioning engine 270 may also track the abandonment of purchase transactions using the advanced verification system. For example, an abandonment of a purchase transaction may take place when the account holder 105 does not complete the purchase transaction after being prompted for security credentials at the advanced verification system interface. As a further example, the decisioning engine may track the abandonment of purchase transactions caused by technical errors (e.g., the website timing out, a merchant server crashing, etc.). The decisioning engine 270 may also track recent purchase transactions where the account holder 105 successfully completed a purchase transaction using the advanced verification system interface (e.g., the date, time, location, etc. of the completed purchase transaction), and/or the value added offers used by each individual account holder 105. The historical transaction data may at least partially comprise all of the monitored data.

In various embodiments, method 501 may comprise personalizing the advanced verification interface based on the historical transaction data (step 515). The decisioning engine 270 may be configured to personalize the advanced verification interface. For example, the decisioning engine 270 may personalize the advanced verification interface by not requiring a security credential field, by not displaying additional fields (e.g., an update account holder data field), and/or the like. In that respect, the historical transaction data may comprise data indicating that the account holder 105 has a high purchase transaction abandonment rate, that the account holder 105 recently completed a purchase transaction using the advanced verification system within the hour, that the account holder has recently abandoned purchase transactions due to technical errors, and/or the like. As a further example, the advanced verification interface may be personalized by providing additional informational overlays (e.g., in response to the historical transaction data indicating that it is the account holder's 105 first use of the system, the advanced verification interface may display help dialogue), by displaying different methods of authentication, by providing greater detail in error messages, by increasing authentication steps and/or difficulty (e.g., in response to an account holder's 105 behavior being out of pattern), and/or the like.

In various embodiments, method 501 may comprise personalizing the value added offer based on the historical transaction data (step 520). The decisioning engine 270 may be configured to personalize the value added offer. For example, in response to the account holder 105 being eligible for more than one value added offer, the decisioning engine 270 may generate a personalized value added offer to comprise the best value added offer for the account holder 105. For example, based on the historical transaction data, the decisioning engine 270 may determine that that the given account holder 105 is unlikely to accept a value added offer for a future credit, but is 90% likely to accept a value added offer to use reward points. In that regard, the decisioning engine 270 may generate the personalized value added offer to comprise the value added offer of using reward points. As a further example, in response to the historical transaction data indicating that the account holder 105 typically uses value added offers for retail purchases, travel purchases, or high dollar amount purchases, decisioning engine 270 may only display the value added offer for those purchase transactions. In response to the historical transaction data indicating that the account holder 105 never uses value added offers, the decisioning engine 270 may not display value added offers for that account holder 105. As a further example, the decisioning engine 270 may personalize the value added offer in response to the type of account holder device 110 the account holder 105 is using (e.g., a different value added offer for account holder 105 using a computer, a tablet, a smartphone (e.g., APPLE® iPHONE®, etc.), and/or the like). The personalized value added offer and the personalized advanced verification interface may be displayed to the account holder 105 similar to in method 201, with brief reference to FIG. 2.

The disclosure and claims do not describe only a particular outcome of presenting a value added offer, but the disclosure and claims include specific rules for implementing the presentation of value added offer and that render information into a specific format that is then used and applied to create the desired results of presenting a value added offer, as set forth in McRO, Inc. v. Bandai Namco Games America Inc. (Fed. Cir. case number 15-1080, Sep. 13, 2016). In other words, the outcome of presenting a value added offer can be performed by many different types of rules and combinations of rules, and this disclosure includes various embodiments with specific rules. While the absence of complete preemption may not guarantee that a claim is eligible, the disclosure does not sufficiently preempt the field of presenting a value added offer at all. The disclosure acts to narrow, confine, and otherwise tie down the disclosure so as not to cover the general abstract idea of just presenting a value added offer. Significantly, other systems and methods exist for presenting a value added offer, so it would be inappropriate to assert that the claimed invention preempts the field or monopolizes the basic tools of presenting a value added offer. In other words, the disclosure will not prevent others from presenting a value added offer, because other systems are already performing the functionality in different ways than the claimed invention. Moreover, the claimed invention includes an inventive concept that may be found in the non-conventional and non-generic arrangement of known, conventional pieces, in conformance with Bascom v. AT&T Mobility, 2015-1763 (Fed. Cir. 2016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or just "apply it" to an abstract process. The disclosure and claims may also be directed to improvements to software with a specific implementation of a solution to a problem in the software arts.

In various embodiments, the systems and methods may include alerting a subscriber when their computer is offline. With brief reference to FIG. 1A, system 100 may include generating customized information, via merchant server 115, and alerting a remote subscriber that the information can be accessed from their computer (e.g., account holder device 110). The alerts are generated by filtering received information, building information alerts and formatting the alerts into data blocks based upon subscriber preference information. The data blocks are transmitted to the subscriber's wireless device (e.g., account holder device 110), which, when connected to the computer, causes the computer to auto-launch an application to display the information alert and provide access to more detailed information about the information alert. More particularly, the method may comprise providing a viewer application to a subscriber for installation on the remote subscriber computer; receiving information at a transmission server sent from a data source over the Internet, the transmission server comprising a microprocessor and a memory that stores the remote subscriber's preferences for information format, destination address, specified information, and transmission schedule, wherein the microprocessor filters the received information by comparing the received information to the specified information; generates an information alert from the filtered information that contains a name, a price and a universal resource locator (URL), which specifies the location of the data source; formats the information alert into data blocks according to said information format; and transmits the formatted information alert over a wireless communication channel to a wireless device associated with a subscriber based upon the destination address and transmission schedule, wherein the alert activates the application to cause the information alert to display on the remote subscriber computer and to enable connection via the URL to the data source over the Internet when the wireless device is locally connected to the remote subscriber computer and the remote subscriber computer comes online.

In various embodiments, the system and method may include a graphical user interface (e.g., via merchant website 120) for dynamically relocating/rescaling obscured textual information of an underlying window to become automatically viewable to the user. By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages (e.g., email) to prevent a computer (e.g., account holder device 110) from being compromised, for example by being infected with a computer virus. The system may scan, via merchant server 115, for example, electronic communications for malicious computer code and clean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations: scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new file, which thus forms a sanitized communication file. The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory; and deleting all data remaining in the quarantine sector.

In various embodiments, system 100 may also address the problem of retaining control over customers during affiliate purchase transactions, using a system for co-marketing the "look and feel" of the host web page with the product-related content information of the advertising merchant's web page (e.g., via merchant website 120). System 100 can be operated by a third-party outsource provider, who acts as a broker between multiple hosts and merchants. Prior to implementation, a host places links to a merchant's webpage on the host's web page. The links are associated with product-related content on the merchant's web page. Additionally, the outsource provider system stores the "look and feel" information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A customer who clicks on an advertising link, via the account holder device 110, for example, is not transported from the host web page to the merchant's web page, but instead is re-directed to a composite web page that combines product information associated with the selected item and visually perceptible elements of the host web page. The outsource provider's server responds by first identifying the host web page where the link has been selected and retrieving the corresponding stored "look and feel" information. The server constructs a composite web page using the retrieved "look and feel" information of the host web page, with the product-related content embedded within it, so that the composite web page is visually perceived by the customer as associated with the host web page. The server then transmits and presents this composite web page to the customer so that she effectively remains on the host web page to purchase the item without being redirected to the third party merchant affiliate. Because such composite pages are visually perceived by the customer as associated with the host web page, they give the customer the impression that she is viewing pages served by the host. Further, the customer is able to purchase the item without being redirected to the third party merchant affiliate, thus allowing the host to retain control over the customer. This system enables the host to receive the same advertising revenue streams as before but without the loss of visitor traffic and potential customers. More particularly, the system may be useful in an outsource provider serving web pages offering commercial opportunities. The computer store containing data, for each of a plurality of first web pages, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of merchants; and wherein the selected merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated; in response to identification of the source page, automatically retrieve the stored data corresponding to the source page; and using the data retrieved, automatically generate and transmit to the web browser a second web page that displays: information associated with the commerce object associated with the link that has been activated, and the plurality of visually perceptible elements visually corresponding to the source page.

Systems, methods and computer program products are described relative to corresponding figures. In the detailed description herein, references to "various embodiments", "various embodiments", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in the various embodiments.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

Those of ordinary skill in the art will appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

As used herein, a "user" may include any person or device that is configured to interact with any of the various systems and/or engage in the various processes that are described herein. A user, for example, may be an account holder, merchant, owner, manager, and/or user of an account. The user may be an account holder whose identity is the subject of a decision leading to issuance of an account in the name of the account holder and for the benefit of that account holder. In another context, the user might include an associate account holder who has been granted authority to execute transactions based on the account.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, JBOSS, EDB® Postgres Plus Advanced Server® (PPAS), etc.). In various embodiments, the server may include web servers (e.g. APACHE, IIS, GWS, SUN JAVA® SYSTEM WEB SERVER, etc.).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MAC-BOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS®/CE/Mobile, OS2, UNIX®, LINUX®, SOLARIS®, MacOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

Terms and phrases similar to "associate", "associated", and/or "associating" may include tagging, flagging, correlating, using a look-up table or any other method or system for indicating or creating a relationship between elements, such as, for example, an account token and a primary transaction account. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

As used herein, the term "account holder", "primary account holder", "associate account holder", "account holder", "primary account holder", "associate account holder", "business" or "merchant" may be used interchangeably with each other, and each shall mean any person, entity, government organization, business, machine, hardware, and/or software. A bank may be part of the system 100, but the bank may represent other types of account issuing institutions, such as transaction account companies, account sponsoring companies, or third party issuers under contract with financial institutions. It is further noted that other participants may be involved in some phases of the transaction, such as an intermediary settlement institution, but these participants are not shown.

As used herein, "match", "same", or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

In various embodiments, an account identifier may identify a consumer. In addition, in various embodiments, a consumer may be identified by a variety of identifiers, including, for example, an email address, a telephone number, a cookie id, a radio frequency identifier (RFID), a biometric, and the like.

A transaction instrument such as a charge card, payment card, debit card, awards card, prepaid card, telephone card, smart card, magnetic stripe card, bar code card, transponder, radio frequency card and/or the like having an account identifier, which account holders (i.e., card holders) typically present to merchant identifier, as part of a transaction, such as a purchase. An "account identifier", as used herein, includes any device, code, number, letter, symbol, digital certificate, smart chip, digital signal, analog signal, biometric or other identifier/indicia suitably configured to allow the consumer to interact or communicate with the system, such as, for example, authorization/access code, personal identification number (PIN), Internet code, other identification code, and/or the like which is optionally located on card. The account identifier may be distributed and stored in any form of plastic, electronic, magnetic, radio frequency, wireless, audio and/or optical device capable of transmitting or downloading data from itself to a second device. A customer account identifier may be, for example, a sixteen-digit payment card number, although each credit provider has its own numbering system, such as the fifteen-digit numbering system used by American Express. Each company's payment account numbers comply with that company's standardized format such that the company using a sixteen-digit format will generally use four spaced sets of numbers, as represented by the number "0000 0000 0000 0000". The first five to seven digits are reserved for processing purposes and identify the issuing bank, card type and etc. In this example, the last sixteenth digit is used as a sum check for the sixteen-digit number. The intermediary eight-to-ten digits are used to uniquely identify the customer.

Distributed computing cluster may be, for example, a Hadoop® cluster configured to process and store big data sets with some of nodes comprising a distributed storage system and some of nodes comprising a distributed processing system. In that regard, distributed computing cluster may be configured to support a Hadoop® distributed file system (HDFS) as specified by the Apache Software Foundation at http://hadoop.apache.org/docs/. For more information on big data management systems, see U.S. Ser. No. 14/944,902 titled INTEGRATED BIG DATA INTERFACE FOR MULTIPLE STORAGE TYPES and filed on Nov. 18, 2015; U.S. Ser. No. 14/944,979 titled SYSTEM AND METHOD FOR READING AND WRITING TO BIG DATA STORAGE FORMATS and filed on Nov. 18, 2015; U.S. Ser. No. 14/945,032 titled SYSTEM AND METHOD FOR CREATING, TRACKING, AND MAINTAINING BIG DATA USE CASES and filed on Nov. 18, 2015; U.S. Ser. No. 14/944,849 titled SYSTEM AND METHOD FOR AUTOMATICALLY CAPTURING AND RECORDING LINEAGE DATA FOR BIG DATA RECORDS and filed on Nov. 18, 2015; U.S. Ser. No. 14/944,898 titled SYSTEMS AND METHODS FOR TRACKING SENSITIVE DATA IN A BIG DATA ENVIRONMENT and filed on Nov. 18, 2015; and U.S. Ser. No. 14/944,961 titled SYSTEM AND METHOD TRANSFORMING SOURCE DATA INTO OUTPUT DATA IN BIG DATA ENVIRONMENTS and filed on Nov. 18, 2015, the contents of each of which are herein incorporated by reference in their entirety.

Any communication, transmission and/or channel discussed herein may include any system or method for delivering content (e.g. data, information, metadata, etc), and/or the content itself. The content may be presented in any form or medium, and in various embodiments, the content may be delivered electronically and/or capable of being presented electronically. For example, a channel may comprise a website or device (e.g., FACEBOOK®, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE® .pdf document, etc.), an "ebook," an "emagazine," an application or microapplication (as described herein), an SMS or other type of text message, an email, FACEBOOK® message, TWITTER® tweet, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE®talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, Dilip Naik, Internet Standards and Protocols (1998); JAVA® 2 Complete, various authors, (Sybex 1999); Deborah Ray and Eric Ray, Mastering HTML 4.0 (1997); and Loshin, TCP/IP Clearly Explained (1997) and David Gourley and Brian Tatty, HTTP, The Definitive Guide (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., Gilbert Held, Understanding Data Communications (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, blockchain, or object-oriented structure and/or any other database configurations. The databases may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2 by IBM® (Armonk, N.Y.), various database products available from ORACLE® Corporation (Redwood Shores, Calif.), MICROSOFT® Access® or MICROSOFT® SQL Server® by MICROSOFT® Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure.

The blockchain structure may include a distributed database that maintains a growing list of data records. The blockchain may provide enhanced security because each block may hold individual transactions and the results of any blockchain executables. Each block may contain a timestamp and a link to a previous block. Blocks may be linked because each block may include the hash of the prior block in the blockchain. The linked blocks form a chain, with only one successor block allowed to link to one other predecessor block.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with various embodiments, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the account or external to but affiliated with account. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the account, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or account. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/account holder, account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a standalone interaction device configured to add, delete, modify, or augment the data in accordance with the header or trailer. As such, in various embodiments, the header or trailer is not stored on the transaction device along with the associated issuer-owned data but instead the appropriate action may be taken by providing to the transaction instrument user at the standalone device, the appropriate option for the action to be taken. The system may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PM, GPG (GnuPG), and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within an web server or any other CMS components or may further reside as a separate entity. A firewall may implement network address translation ("NAT") and/or network address port translation ("NAPE"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In various embodiments, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® NT web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system. In various embodiments, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communication means, such as the internet. Web services are typically based on standards or protocols such as XML, SOAP, AJAX, WSDL and UDDI. Web services methods are well known in the art, and are covered in many standard texts. See, e.g., Alex Nghiem, IT Web Services: A Roadmap for the Enterprise (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE MQ™ (formerly MQSeries) by IBM®, Inc. (Armonk, N.Y.) is an example of a commercially available middleware product. An Enterprise Service Bus ("ESB") application is another example of middleware.

Those skilled in the art will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

In various embodiments, the software elements of the system may also be implemented using Node.js®. Node.js® may implement several modules to handle various core functionalities. For example, a package management module, such as Npm®, may be implemented as an open source library to aid in organizing the installation and management of third-party Node.js® programs. Node.js® may also implement a process manager, such as, for example, Parallel Multithreaded Machine ("PM2"); a resource and performance monitoring tool, such as, for example, Node Application Metrics ("appmetrics"); a library module for building user interfaces, such as for example ReachJS®; and/or any other suitable and/or desired module.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in *In Re Nuijten* to fall outside the scope of patentable subject matter under 35 U.S.C. § 101.

In various embodiments, the system may incorporate a biometric security system that may be used for providing biometrics as a secondary form of identification. The biometric security system may include a transponder and a reader communicating with the system. The biometric security system also may include a biometric sensor that detects biometric samples and a device for verifying biometric samples. The biometric security system may be configured with one or more biometric scanners, processors and/or systems. A biometric system may include one or more technologies, or any portion thereof, such as, for example, recognition of a biometric. As used herein, a biometric may include a user's voice, fingerprint, facial, ear, signature, vascular patterns, DNA sampling, hand geometry, sound, olfactory, keystroke/typing, iris, retinal or any other biometric relating to recognition based upon any body part, function, system, attribute and/or other characteristic, or any portion thereof.

Phrases and terms similar to a "party" may include any individual, consumer, customer, group, business, organization, government entity, transaction account issuer or processor (e.g., credit, charge, etc.), merchant, consortium of merchants, account holders, account holder, charitable organization, software, hardware, and/or any other type of entity. The terms "user," "consumer," "purchaser," and/or the plural form of these terms are used interchangeably throughout herein to refer to those persons or entities that are alleged to be authorized to use a transaction account.

Phrases and terms similar to "account", "account identifier", "account code" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account identifier may optionally be located on or associated with a rewards account, charge account, credit account, debit account, prepaid account, telephone card, embossed card, smart card, magnetic stripe card, bar code card, transponder, radio frequency card or an associated account.

The system may include or interface with any of the foregoing accounts, devices, and/or a transponder and reader (e.g. RFID reader) in RF communication with the transponder (which may include a fob), or communications between an initiator and a target enabled by near field communications (NFC). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies. For more information regarding NFC, refer to the following specifications all of which are incorporated by reference herein: ISO/IEC 18092/ECMA-340, Near Field Communication Interface and Protocol-1 (NFCIP-1); ISO/IEC 21481/ECMA-352, Near Field Communication Interface and Protocol-2 (NFCIP-2); and EMV 4.2 available at http://www.emvco.com/default.aspx.

In various embodiments, account identifiers and/or account tokens as disclosed herein may be distributed and stored in any form of plastic, electronic, magnetic, radio frequency, wireless, audio and/or optical device capable of transmitting or downloading data from itself to a second device. A consumer account identifier may be, for example, a sixteen-digit account identifier, although each credit provider has its own numbering system, such as the fifteen-digit numbering system used by American Express. Each company's account identifiers comply with that company's standardized format such that the company using a fifteen-digit format will generally use three-spaced sets of numbers, as represented by the number "0000 000000 00000". The first five to seven digits are reserved for processing purposes and identify the issuing bank, account type, etc. In this example, the last (fifteenth) digit is used as a sum check for the fifteen-digit number. The intermediary eight-to-eleven digits are used to uniquely identify the consumer. A merchant account identifier may be, for example, any number or alpha-numeric characters that identify a particular merchant for purposes of account acceptance, account reconciliation, reporting, or the like.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is intended to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A computer-implemented method, comprising:
   receiving a purchase request from a computer system associated with an account holder;
   determining an enrollment status of the account holder in a secondary authentication system in response to receiving the purchase request;
   determining a value added offer based at least in part on the account holder in response to determining from the enrollment status that the account holder is not enrolled in the secondary authentication system, the value added offer comprising at least one of: an account credit, an amount of reward points, a coupon, or a purchase protection plan; and
   causing a secondary authentication interface to be displayed on the computer system associated with the account holder, the secondary authentication interface comprising the value added offer and a security credential prompt.

2. The computer-implemented method of claim 1, wherein the purchase request includes payment account information.

3. The computer-implemented method of claim 2, further comprising requiring, in response to determining that the account holder has enrolled in the secondary authentication system, a security credential to be entered via the security credential prompt after the payment account information is received in order for the purchase request to be authorized.

4. The computer-implemented method of claim 1, further comprising:
   receiving a security credential input and an acceptance of the value added offer via the secondary authentication interface; and
   modifying data associated with an account of the account holder to apply the at least one of: the account credit, the amount of rewards points, the coupon, or the purchase protection plan to the account.

5. The computer-implemented method of claim 1, further comprising transmitting an authorization request for a purchase amount to an issuer system in response to receiving the purchase request.

6. The computer-implemented method of claim 1, further comprising customizing the secondary authentication interface based at least in part on data indicating an acceptance rate of the value added offer.

7. The computer-implemented method of claim 6, wherein the secondary authentication interface is customized by removing a security credential input field.

8. The computer-implemented method of claim 1, further comprising customizing the value added offer for the account holder based at least in part on a recent purchase transaction of the account holder.

9. A computer system, comprising:
   a processor;
   a memory; and
   instructions stored in the memory that, when executed by the processor, cause the computer system to at least:
      receive a purchase request from a second computer system associated with an account holder;
      responsive to receiving the purchase request, determine an enrollment status of the account holder in a secondary authentication system;
      responsive to determining from the enrollment status that the account holder is not enrolled in the secondary authentication system, determine a value added offer based at least in part on the account holder and comprising at least one of: an account credit, an amount of reward points, a coupon, or a purchase protection plan; and
      cause a secondary authentication interface to be displayed on the second computer system associated with the account holder, the secondary authentication interface comprising the value added offer and a security credential prompt.

10. The computer system of claim 9, wherein the purchase request includes payment account information, and the instructions cause the computer system to at least require, in response to determining that the account holder has enrolled in the secondary authentication system, a security credential to be entered via the security credential prompt after the payment account information is received in order for the purchase request to be authorized.

11. The computer system of claim 9, wherein the instructions further cause the computer system to at least:
   receive a security credential input and an acceptance of the value added offer via the secondary authentication interface; and
   modify data associated with an account of the account holder to apply the at least one of: the account credit, the amount of rewards points, the coupon, or the purchase protection plan to the account.

12. The computer system of claim 9, wherein the instructions further cause the computer system to at least transmit an authorization request for a purchase amount to an issuer system in response to receiving the purchase request.

13. The computer system of claim 9, wherein the instructions further cause the computer system to at least customize the secondary authentication interface based at least in part on data indicating an acceptance rate of the value added offer.

14. The computer system of claim 9, wherein the instructions further cause the computer system to at least customize the value added offer for the account holder based at least in part on a recent purchase transaction of the account holder.

15. A non-transitory computer-readable medium storing instructions that, when executed, cause a computer system to at least:
   receive a purchase request from a second computer system associated with an account holder;
   responsive to receiving the purchase request, determine an enrollment status of the account holder in a secondary authentication system;
   responsive to determining from the enrollment status that the account holder is not enrolled in the secondary authentication system, determine a value added offer based at least in part on the account holder and comprising at least one of: an account credit, an amount of reward points, a coupon, or a purchase protection plan; and cause a secondary authentication interface to be displayed on the second computer system associated with the account holder, the secondary authentication interface comprising the value added offer and a security credential prompt.

16. The non-transitory computer-readable medium of claim 15, wherein the purchase request includes payment account information, and the instructions cause the computer system to at least require, in response to determining that the account holder has enrolled in the secondary authentication system, a security credential to be entered via the security credential prompt after the payment account information is received in order for the purchase request to be authorized.

17. The non-transitory computer-readable medium of claim 15, wherein the instructions further cause the computer system to at least:
receive a security credential input and an acceptance of the value added offer via the secondary authentication interface; and
modify data associated with an account of the account holder to apply the at least one of: the account credit, the amount of rewards points, the coupon, or the purchase protection plan to the account.

18. The non-transitory computer-readable medium of claim 15, wherein the instructions further cause the computer system to at least transmit an authorization request for a purchase amount to an issuer system in response to receiving the purchase request.

19. The non-transitory computer-readable medium of claim 15, wherein the instructions further cause the computer system to at least customize the secondary authentication interface based at least in part on data indicating an acceptance rate of the value added offer.

20. The non-transitory computer-readable medium of claim 15, wherein the instructions further cause the computer system to at least customize the value added offer for the account holder based at least in part on a recent purchase transaction of the account holder.

* * * * *